United States Patent [19]
Kobayashi et al.

[11] Patent Number: 5,712,360
[45] Date of Patent: Jan. 27, 1998

[54] METHOD OF MANUFACTURING A COHYDROLYZED POLYSILOXANE CHARGE TRANSPORTING MATERIAL

[75] Inventors: Hideki Kobayashi, Chiba Prefecture; Nobuo Kushibiki, Kanagawa, both of Japan

[73] Assignees: Dow Corning Asia, Ltd.; Dow Corning Toray Silicone Co., Ltd., both of Tokyo, Japan

[21] Appl. No.: 743,262

[22] Filed: Nov. 4, 1996

[30] Foreign Application Priority Data

Nov. 6, 1995 [JP] Japan .................................. 7-287668

[51] Int. Cl.$^6$ ................................................ C08G 77/26
[52] U.S. Cl. ........................... 528/38; 556/413; 528/413
[58] Field of Search ..................... 556/413; 528/38, 528/43

[56] References Cited

U.S. PATENT DOCUMENTS

| | | | |
|---|---|---|---|
| 2,931,693 | 4/1960 | Bailey et al. | 556/413 |
| 3,171,851 | 3/1965 | Pepe | 556/413 |
| 3,647,429 | 3/1972 | Goldman et al. | 556/413 |
| 5,187,310 | 2/1993 | Mishima et al. | 556/413 |
| 5,230,976 | 7/1993 | Schank et al. | 430/59 |
| 5,232,801 | 8/1993 | Rule et al. | 430/59 |
| 5,326,661 | 7/1994 | Sansone et al. | 430/20 |
| 5,436,099 | 7/1995 | Schank et al. | 430/59 |

FOREIGN PATENT DOCUMENTS

| | | |
|---|---|---|
| 224 784 A | 6/1987 | European Pat. Off. . |
| 446 895 A | 9/1991 | European Pat. Off. . |
| 457 212 A | 11/1991 | European Pat. Off. . |
| 480 466 A | 4/1992 | European Pat. Off. . |
| 61-132954 | 6/1986 | Japan . |
| 4-324454 | 11/1992 | Japan . |

OTHER PUBLICATIONS

Patent abstracts of Japan, vol. 004, No. 146 (P-031), Oct. 15,1980.

*Primary Examiner*—Margaret W. Glass
*Attorney, Agent, or Firm*—James E. Bittel

[57] ABSTRACT

The invention provides a method for manufacturing a polysiloxane resin with charge transporting properties by uniformly bonding charge transporting groups in effective concentration within a polysiloxane resin. The charge transporting groups are formed in the resin by cohydrolyzing and condensing silane monomers with an aromatically substituted tertiary amine which has been modified by substitution of one or more of the aromatic rings with a hydrocarbon group containing a silyl group bearing hydrolyzable substituents. Tertiary amines have ionization potentials of 4.5 to 6.2 volts.

12 Claims, No Drawings

METHOD OF MANUFACTURING A COHYDROLYZED POLYSILOXANE CHARGE TRANSPORTING MATERIAL

BACKGROUND OF THE INVENTION

This invention pertains to a method for manufacturing a polysiloxane charge transporting material of the kind used in electrophotocopying apparatuses. The material is prepared by cohydrolyzing an organosilicon compound and a charge transporting component containing silyl groups with hydrolyzable substituents.

Organic photoconductors used in electrophotography must possess not only electrical and optical characteristics required for the electrophotographic process, but also the durability required for the charging process and resistance to abrasive wear which is required for the process of removal of the toner from the organic photoconductor after the development and image-transfer operations. A recent trend in the development of organic photoconductors for electrophotography is to utilize organic compounds which are more suitable from the point of view of productivity and protection of the environment. Organic photoconductors are produced by dispersing or dissolving an organic compound with charge transporting properties in an acrylic resin, polycarbonate resin, polyester resin, polyurethane resin or a similar resin, and then to forming a layer of the resin over a charge-generation layer, or forming a layer of the resin in which a charge-generation substance is also dispersed.

Besides merely transporting a charge generated in a charge-generating layer from this layer to the surface of a organic photoconductor, the charge-transporting layer used in the electrophotographic process should also possess appropriate electrical and mechanical properties. It is desirable that the resin of the charge transporting layer be resistant to corona discharge have other properties compatible with toner development, image transporting, and cleaning. The resin and dispersed charge transporting compounds should possess many other characteristics such as film-forming properties, etc. required for industrial production. Not all existing organic photoconductors, however, satisfy the requirements.

In an attempt to solve the problems, silicone materials have received some previous consideration because of their demonstrated stability against corona discharge and low surface-energy characteristics. Thus, attempts to improve surface characteristics of an organic photoconductor are described by using silicone-oil additives in Japanese Laid-Open Patent Publication (Kokai) No. 61-132954 and by using silicone-resin powder in (Kokai) No. 4-324454. Studies were also conducted with regard to materials for protecting the surface of an organic photoconductor by using block copolymers of polycarbonate with the addition of a cross-linking silicone resin, a silicone-modified polyurethane, and a silicone-modified polyester.

Since polysiloxane resin is not sufficiently compatible with other resins, simple mixing with other resins causes separation of phases and often results in components bleeding to the surface of the mixed resin. These properties can be improved by using block copolymers. However, as is known from the chemistry of polymers, block copolymers which are composed of essentially non-compatible resins have a phase-separation structure and create light scattering. Furthermore, since polysiloxane resin in general is electrically neutral and inactive and since, When used alone, it has no charge transporting properties, such functions is acquired by adding an charge transporting compound to the resin. However, polysiloxane resin is generally a low-molecular weight polymer which does not easily disperse and uniformly dissolve other compounds.

It is an object of the present invention to provide a method of manufacturing a polysiloxane resin with charge transporting properties by uniformly bonding groups with charge transporting properties to silicon atoms in polysiloxane resin for imparting a charge transporting function to the resin.

SUMMARY OF THE INVENTION

The invention is a method of manufacturing a polysiloxane material having charge transporting properties, the method comprising cohydrolyzing and condensing in an organic solvent, a mixture comprising:

an organosilicon compound or a partially hydrolyzed product of the organosilicon compound where the organosilicon compound is selected from a group consisting of $R_3SiZ$, $R_2SiZ_2$, $R_1SiZ_3$ and $SiZ_4$, wherein R is monovalent hydrocarbon group and Z is hydrolyzable group, thereby providing polysiloxane resin having a ratio of monovalent hydrocarbon groups to silicon atoms of 0.5 to 1.5 and a charge transporting silicon compound represented by the formula:

wherein A denotes an organic group derived from a charage transporting compound having the ionization potential of 4.5 to 6.2 eV, which is an aromatically substituted tertiary amine having a plurality of aromatic groups, where at least one of the aromatic hydrocarbon groups is bonded to $R^1$ which is an alkylene group having 1 to 18 carbon atoms; $R^2$ is a monovalent hydrocarbon group or a halogen-substituted monovalent hydrocarbon group having 1 to 15 carbon atoms; Q is a hydrolyzable group; n is an integer from 1 to 3; p is an integer from 1 to 3.

Examples of hydrolyzable groups Q include a hydroxyl group, alkoxy group, methylethylketoximo group, diethylamino group, acetoxy group, propenoxy group, —Cl, etc. Preferable among the above are a hydroxyl group as well as a methoxy group, ethoxy group, butoxy group, propoxy group and similar alkoxy groups having 1 to 6 carbon atoms.

DESCRIPTION OF THE PREFERRED EMBODIMENTS

The organosilicon compound is selected from a group consisting of $R_3SiZ$, $R_2SiZ_2$, $R_1SiZ_3$ and $SiZ_4$, wherein R is monovalent hydrocarbon group and Z is hydrolyzable group. Examples of hydrolyzable groups Z include a hydroxyl group, alkoxy group, methylethylketoximo group, diethylamino group, acetoxy group, propenoxy group, —Cl, etc. Preferable among the above are a hydroxyl group as well as a methoxy group, ethoxy group, butoxy group, propoxy group and similar alkoxy groups having 1 to 6 carbon atoms. This mixture that is hydrolyzed should contain organosilicon compounds such that the ratio of to the monovalent hydrocarbon groups to the silicon atoms is in the range of 0.5 to 1.5. This can be achieved by hydrolyzing and condensing a mixture containing a single organosilicon compound or a combination of several organosilicon compounds or partial hydrolyzates of the compounds or combinations of compounds.

The monovalent hydrocarbon group of the organosilicon compound may be selected from aliphatic hydrocarbon groups and aromatic hydrocarbon groups. The monovalent hydrocarbon group R which is bonded directly to a silicon atom may be a saturated straight or branched hydrocarbon group with 1 to 18 carbon atoms such as, e.g., a methyl, ethyl, propyl, butyl, amyl, hexyl, 2-ethylhexyl, dodecyl, octadecyl group, etc., an alkenyl group such as vinyl, allyl, etc., an aryl group such as phenyl, tolyl, halogenated hydrocarbon group, e.g., trifluoropropyl, heptafluoropentyl, nanofluorohexyl or a similar fluorohydrocarbon group, as well as a chloromethyl, chloroethyl group, etc., as well as a straight or a branched saturated hydrocarbon group with a halogen substituent with 1 to 18 carbon atoms.

Synthesis of siloxane resins may be accomplished by the method disclosed in Japanese Patent Publications [Kokoku] 26-2696 and [Kokoku] 28-297. Further synthesis methods for polysiloxane polymers are described in "Chemistry and Technology of Silicones" by Walter Noll, Academic Press, Inc., 1968, p. 191.

The organosilicon compound is not generally soluble in all solvents. Since, however, it is readily soluble in toluene or similar aromatic hydrocarbon, as well as in chloroform or a similar halogenated hydrocarbon, it is recommended to use one of these types of solvents as the solvent or at least cosolvent for the hydrolysis reaction. Water and any alkanol hydrolysis product generally separates in one layer and the polysiloxane resin and other organic solvent separate as a second layer. The product is separated and washed with water and neutralized. The copolymer polysiloxane obtained by the above method contains hydroxyl groups and/or hydrolyzable groups which are bonded to silicon atoms in an amount of 0.01 to 10 wt. %. If these groups remain in an amount that exceeds the recommended range, it will impair the storage stability, and if the amount is below the lower limit, the material will have poor physical properties after the formation of a film. The best results are obtained if the residual hydroxyl groups and/or hydrolyzable groups is in the range from 0.1 to 4.0 wt. %.

It is recommended that a copolymerization ratio of the charge transporting component to the organosilicon compound be within the range of 20 to 200 parts by weight of the charge transporting component per 100 parts by weight of the organosilicon compound. If less than 20 parts by weight are used, the copolymer will have insufficient charge transporting properties and the sensitivity will drop. If, on the other hand, 200 parts is exceeded, it will impair mechanical properties. It is preferred that the range be from 30 to 150 parts by weight.

The charge transporting component for use in the invention has an organosilicon group bonded to an electron-donating group via a hydrocarbon group. Use of the hydrocarbon group to bind the silyl group to the aromatic group is preferred because in the case of a direct bonding, the π electron of the aromatic ring will have a π-d interaction with the d electron of silicon. This interaction causes a shift in the ionization potential from that of the starting material. To obviate this problem, it is easier to use the spacer hydrocarbon group so that the desired ionization potential is assured by the selection of the organic photoconductor.

One of an example of the method for introduction of a hydrocarbon group between a silicon atom and one of the aromatic rings consists bonding an unsaturated aliphatic group substituted on an aroamtic ring of the charge transporting material to an alkoxysilane having hydrocarbon atom and alkoxy group as subsitituents of silicon atom by hydrosilylation reaction. For example, the charge transporting component can be produced by a reaction between a vinyl group substituted on an aromatic ring bonded to nitrogen of an aromatically substituted tertiary amine having an ionization potential within the range of 4.5 to 6.2 eV and an organic silicon compound having a hydrogen atom. The vinyl group may be introduced into an aromatic group by formylation of a vinyl group or a hydrogen atom substituted on an aromatic ring, with Wittig reaction of aldehyde. The hydrosilylation reaction can then be successfully completed. Another method starts with a saturated hydrocarbon group substituted in the aromatic group, e.g., a methyl group, which is bromomethylated, then a lithio-complex is formed, and complex is reacted with a halogenated alkoxysilane. The ionization potential is measured under the atmospheric pressure by means of photoelectron spectronmeter (AC-1 surface analyzer from Riken Keiki Co., was used).

The aromatically substituted tertiary amine with an ionization potential of 4.5 to 6.2 eV used in the method of this invention may be one of the following. In the formulas, Me denotes methyl, while Et denotes ethyl.

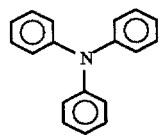

1A

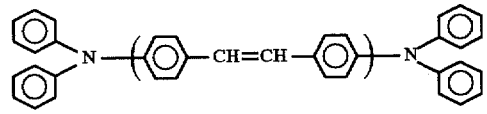

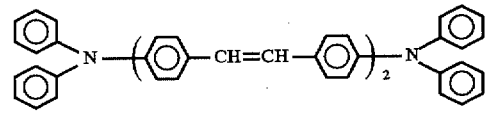

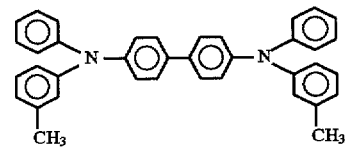

1B

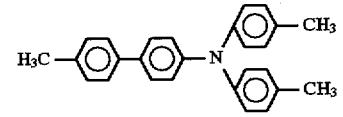

1C

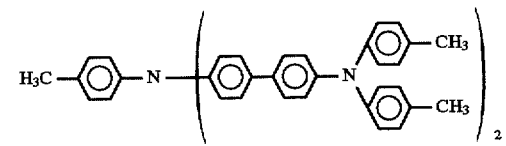

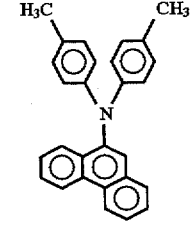

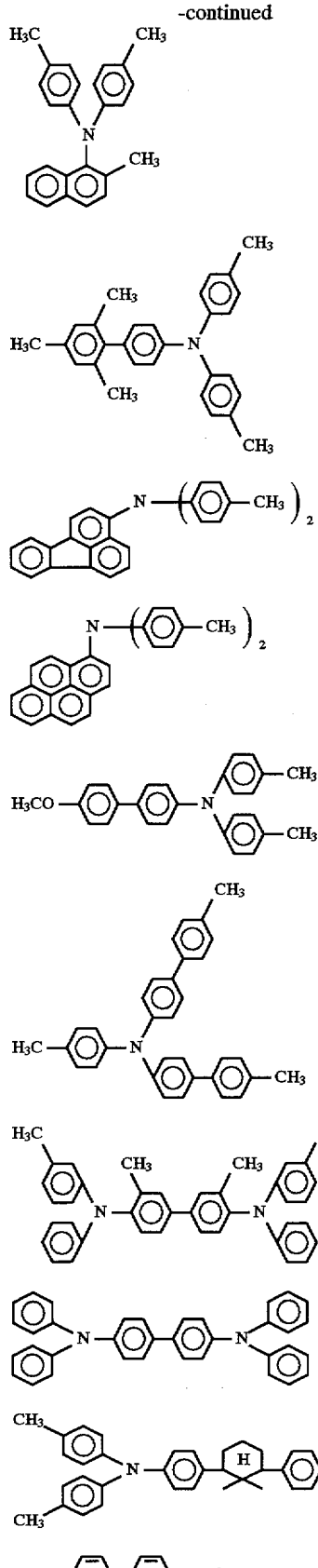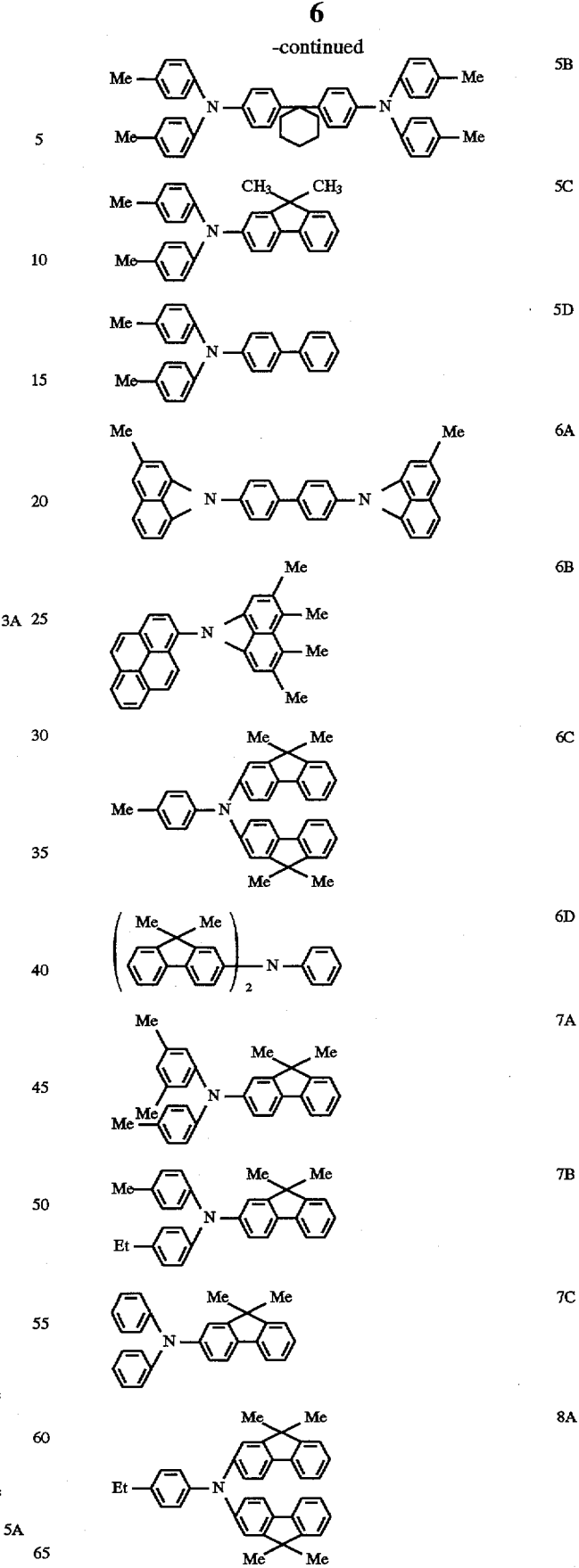

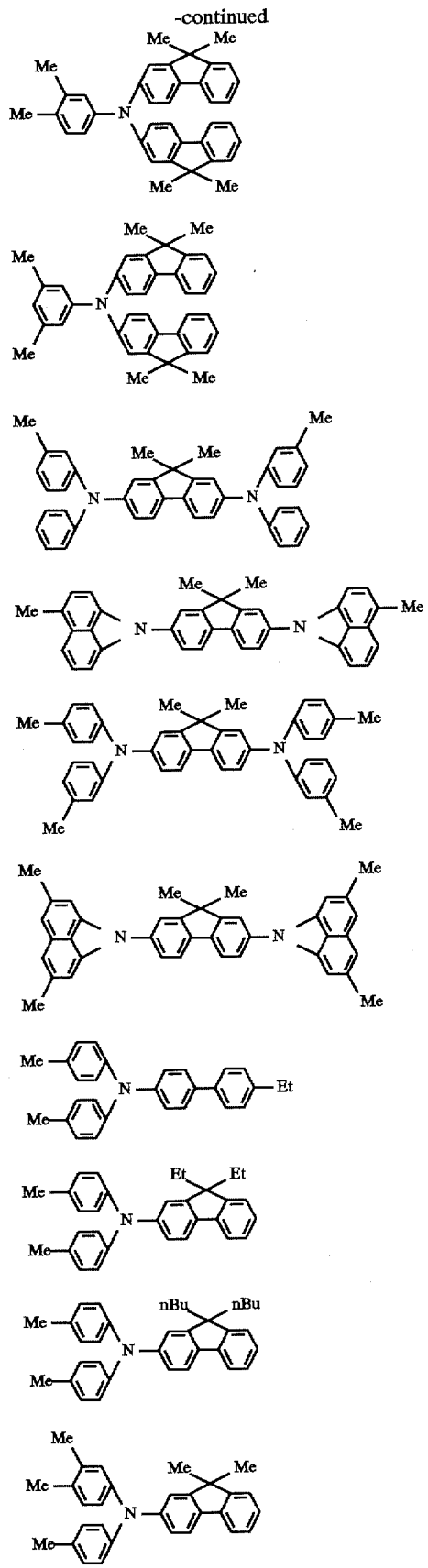

-continued
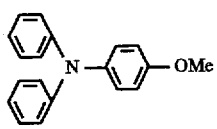
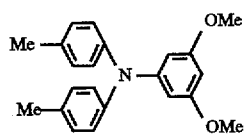
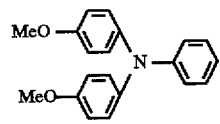
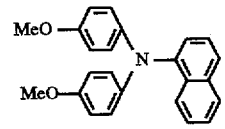
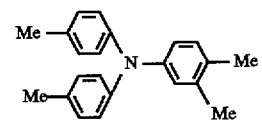
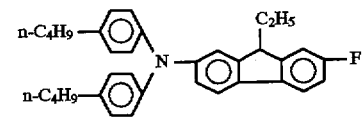
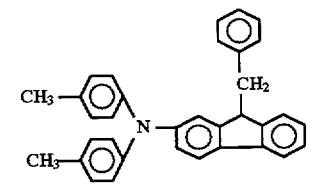
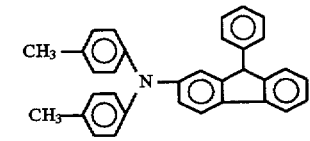
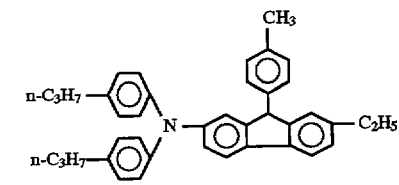
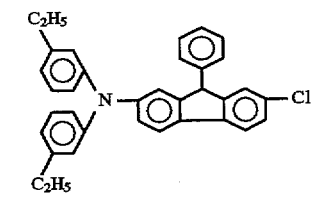
-continued
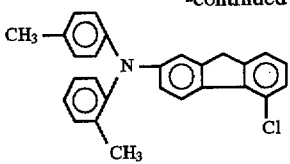 14A
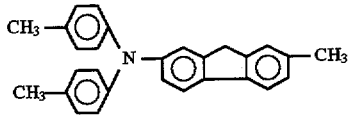 14B
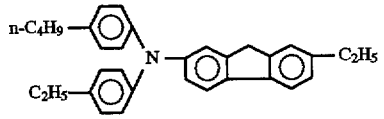 14C
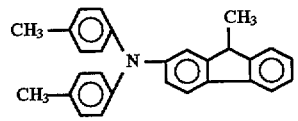 14D
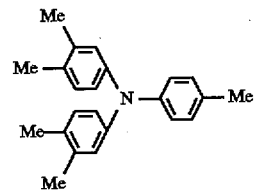 14E
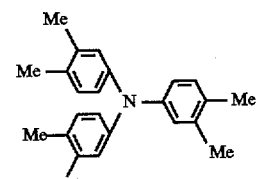 17A
17B
17C
17D
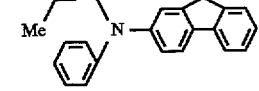 18A
 18B
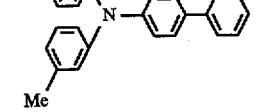
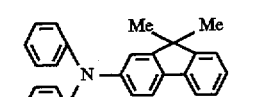

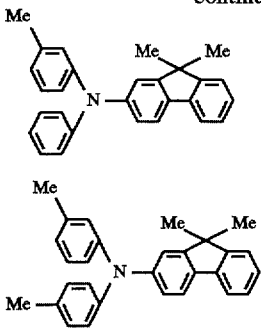

Following are representative ionization and oxidation potentials for some of the aromatic substituted tertiary amines A shown above. These ionization and oxidation potentials refer to the specific compounds identified above with corresponding reference indicia.

| | | |
|---|---|---|
| 1A - | Ionization potential: | 5.7 eV |
| 1B - | Oxidation potential: | 0.78 V |
| | Ionization potential: | 5.42 eV |
| 1C - | Oxidation potential: | 0.81 V |
| | Ionization potential: | 5.45 eV |
| 3A - | Oxidation potential: | 0.84 V |
| | Ionization potential: | 5.47 eV |
| 5A - | Oxidation potential: | 0.57 V |
| | Ionization potential: | 5.22 eV |
| 5B - | Oxidation potential: | 0.75 V |
| | Ionization potential: | 5.40 eV |
| 5C - | Oxidation potential: | 0.76 V |
| | Ionization potential: | 5.40 eV |
| 5D - | Oxidation potential: | 0.86 V |
| | Ionization potential: | 5.49 eV |
| 6A - | Oxidation potential: | 0.76 V |
| | Ionization potential: | 5.40 eV |
| 6B - | Oxidation potential: | 0.79 V |
| | Ionization potential: | 5.43 eV |
| 6C - | Oxidation potential: | 0.75 V |
| | Ionization potential: | 5.40 eV |
| 6D - | Oxidation potential: | 0.77 V |
| | Ionization potential: | 5.41 eV |
| 7A - | Oxidation potential: | 0.80 V |
| | Ionization potential: | 5.44 eV |
| 7B - | Oxidation potential: | 0.79 V |
| | Ionization potential: | 5.43 eV |
| 7C - | Oxidation potential: | 0.88 V |
| | Ionization potential: | 5.51 eV |
| 8A - | Oxidation potential: | 0.76 V |
| | Ionization potential: | 5.40 eV |
| 8B - | Oxidation potential: | 0.74 V |
| | Ionization potential: | 5.38 eV |
| 8C - | Oxidation potential: | 0.77 V |
| | Ionization potential: | 5.41 eV |
| 9A - | Oxidation potential: | 0.63 V |
| | Ionization potential: | 5.28 eV |
| 9B - | Oxidation potential: | 0.62 V |
| | Ionization potential: | 5.27 eV |
| 9C - | Oxidation potential: | 0.58 V |
| | Ionization potential: | 5.22 eV |
| 9D - | Oxidation potential: | 0.59 V |
| | Ionization potential: | 5.23 eV |
| 10A - | Oxidation potential: | 0.80 V |
| | Ionization potential: | 5.44 eV |
| 10B - | Oxidation potential: | 0.78 V |
| | Ionization potential: | 5.43 eV |
| 10C - | Oxidation potential: | 0.78 V |
| | Ionization potential: | 5.43 eV |
| 10D - | Oxidation potential: | 0.76 V |
| | Ionization potential: | 5.41 eV |
| 11A - | Oxidation potential: | 0.58 V |
| | Ionization potential: | 5.23 eV |
| 11B - | Oxidation potential: | 0.58 V |
| | Ionization potential: | 5.23 eV |
| 11C - | Oxidation potential: | 0.63 V |
| | Ionization potential: | 5.28 eV |
| 11D - | Oxidation potential: | 0.77 V |
| | Ionization potential: | 5.41 eV |
| 12A - | Oxidation potential: | 0.83 V |
| | Ionization potential: | 5.47 eV |
| 12B - | Oxidation potential: | 0.83 V |
| | Ionization potential: | 5.47 eV |
| 12C - | Oxidation potential: | 0.84 V |
| | Ionization potential: | 5.47 eV |
| 12D - | Oxidation potential: | 0.83 V |
| | Ionization potential: | 5.47 eV |
| 13A - | Oxidation potential: | 0.83 V |
| | Ionization potential: | 5.47 eV |
| 13B - | Oxidation potential: | 0.85 V |
| | Ionization potential: | 5.48 eV |
| 13C - | Oxidation potential: | 0.74 V |
| | Ionization potential: | 5.38 eV |
| 13D - | Oxidation potential: | 0.80 V |
| | Ionization potential: | 5.44 eV |
| 14A - | Oxidation potential: | 0.83 V |
| | Ionization potential: | 5.47 eV |
| 14B - | Oxidation potential: | 0.84 V |
| | Ionization potential: | 5.47 eV |
| 14C - | Oxidation potential: | 0.72 V |
| | Ionization potential: | 5.36 eV |
| 14D - | Oxidation potential: | 0.73 V |
| | Ionization potential: | 5.38 eV |
| 14E - | Oxidation potential: | 0.81 V |
| | Ionization potential: | 5.45 eV |
| 17A - | Oxidation potential: | 0.78 V |
| | Ionization potential: | 5.43 eV |
| 17B - | Oxidation potential: | 0.76 V |
| | Ionization potential: | 5.40 eV |
| 17C - | Oxidation potential: | 0.82 V |
| | Ionization potential: | 5.46 eV |
| 17D - | Oxidation potential: | 0.82 V |
| | Ionization potential: | 5.45 eV |
| 18A - | Oxidation potential: | 0.89 V |
| | Ionization potential: | 5.52 eV |
| 18B - | Oxidation potential: | 0.81 V |
| | Ionization potential: | 5.45 eV |
| 18C - | Oxidation potential: | 0.84 V |
| | Ionization potential: | 5.47 eV |
| 18D - | Oxidation potential: | 0.79 V |
| | Ionization potential: | 5.43 eV |

A method for introducing a silyl group having hydrolyzable group to an aromatically substituted, tertiary amine by the reaction of aforementioned organosilicon hydride with said aromatically substituted, tertiallyamine, is detailed, referring to alkoxysilyl group as representative embodiment of the silyl group having hydrolyzable group, as follows:

There are no particular limitations as to which position on the aromatic ring of the tertiary-amine which the silyl group is to be introduced, nor is it necessary for the silyl groups to be bonded to all aromatic rings. The determination is made in consideration of factors such as the solubility in the polysiloxane resin. A preferred method of introducing a vinyl group to an aromatic group substituted on a nitrogen atom is to formylate a methyl group or a hydrogen atom subsituted on an aromatic ring. The vinyl group is then introduced by Wittig reaction of aldehyde product. A vinyl group can also be introduced by a dehydrohalogenation between the hydrogen on a secondary amine and a halogenated aromatic group compound already substituted by a vinyl group.

The SiH containing compound which reacts with the vinyl group bonded to the aromatic ring of the tertiary amine must contain in addition to the hydrogen atom substituent on silicon, at least one hydrolyzable group such as an alkoxy group. This compound is added to the vinyl group by means of a hydrosilylation reaction. A hydrolyzable group Q, such as an alkoxy group represented by the formula $OR^3$ is required on the silane for subsequent cohydrolysis with other silane monomers to form the polysiloxane material. The $R^3$ of such alkoxy group-$OR^3$ is selected from relatively short carbon chains of 1 to 6 carbon atoms such as methyl, ethyl, propyl, butyl, amyl, and hexyl, or branched alkyls, depending on the intended use of the product, according to the safety during the hydrosilylation process and the hydrolysis characteristics desired. The n denotes the number of Q groups such as alkoxy groups substituting silicon; when the number is higher than 1, the hydrophilic property of the compound is improved; when there are several groups that are able to be condensed, the compound also acts as a cross-linking agent, so selection of specific compounds must be made taking into consideration the hardness of the polysiloxane resin desired, as well as the hydrophilic characteristic desired.

The organic group $R^2$ which is directly bonded to the silicon atom, may be selected as appropriate to improve compatibility with other silane comonomers, or according to the various purposes desired such as the solubility in the resin, reactivity during the hydrosilylation reaction, and other property adjustments of the polysiloxane resin. For example $R^2$ is selected from alkyl groups such as methyl, ethyl, propyl, butyl, amyl, and hexyl; aryl groups such as phenyl and tolyl; alkenyl groups such as vinyl and allyl; halogenated hydrocarbon groups such as chloromethyl and chloropropyl; and fluorohydrocarbon groups represented by trifluoropropyl, heptafluoropentyl, and nanofluorohexyl. If the substituent on the silicon in the other siloxane units of the polysiloxane is methyl, it is easily imaginable that the solubility would be better if the $R^2$ is a methyl group.

The organosilicon compound is selected from a group consisting of $R_3SiZ$, $R_2SiZ_2$, $R_1SiZ_3$ and $SiZ_4$, wherein R is monovalent hydrocarbon group and Z is hydrolyzable group, and form silicone resins upon hydrolysis and condensation. The R substituent is selected from aliphatic and aromatic monovalent hydrocarbon group. There are no special limitations with regard to the hydrolyzable groups Z, but alkoxy groups are preferred. Organotrialkoxysilane is used for obtaining, by hydrolysis and condensation, a silicone resin which in the silicone industry is known as a T-resin. The monovalent aliphatic and aromatic hydrocarbon groups which are bonded directly to silicon atoms may be saturated straight or branched hydrocarbon groups with 1 to 18 carbon atoms such as, e.g., a methyl, ethyl, propyl, butyl, amyl, hexyl, 2-ethylhexyl, dodecyl, octadecyl group, etc., an alkenyl group such as vinyl, allyl, etc., an aryl group such as phenyl, tolyl, halogenated hydrocarbon group, e.g., trifluoropropyl, heptafluoropentyl, nanofluorohexyl or a similar fluorohydrocarbon group, as well as a chloromethyl, chloroethyl group, etc., as well as other halogen substituted straight or branched saturated hydrocarbon groups having 1 to 18 carbon atom.

A silicon compound having a number of hydrolyzable groups other than 3 in its molecule may be used as a third copolymerization component, provided that in the final polysiloxane the ratio of the number of the monovalent hydrocarbon groups to silicon atoms is within the range of 0.5 to 1.5. For example, diorganodialkoxysilane, tetraorganodialkoxydisiloxane or the like may be selected for improving physical properties of the polysiloxane resin such as mechanical strength and film-forming characteristics. If the ratio of the number of monovalent organic groups to silicon atoms is lower than the 0.5, then the resin will become harder and more brittle, and with the ratio above 1.5 the tendency will reverse. Therefore, the structure of the copolymer may be optimized by taking into account such factors as the type of the alkyl groups substituted on silicon atoms, the structure of the charge transporting component, and the amounts of copolymer siloxane units.

The uncured polysiloxane material having charge transporting properties may be dissolved in an appropriate solvent and used for the manufacture of an organic photoconductive device based on the principle of electrophotography. The material used for coating should be selected so as not to affect other structural materials used in the construction of the organic photoconductive device. Coating may be carried out by conventional methods such as dipping, spraying, spinning, etc. After the application of the coating material, the coating is heated to a temperature close to the boiling point of the solvent, whereby the residual solvent is removed, and then a film of the polysiloxane material having charge transporting properties is formed by curing the coating at a temperature from room temperature to 150° C. The film is transparent, free of white suspensions and similar defects, and may have a thickness from several microns to several tens of microns.

SYNTHESIS EXAMPLE 1

Synthesis of 4-(N, N-diphenylamino)benzaldehyde 101.4 g of triphenylamine and 35.5 mL of DMF were placed in a three-neck flask, and while stirring with cooling in ice water, 84.4 mL of phosphorus oxychloride was dripped into the flask; the temperature was raised to 95° C., and the mixture was reacted for 5 hours. The solution was poured into 4 L of warm water and stirred for 1 hour. The precipitate was collected and washed in a 1:1 ethanol/water, and 4-(N, N-diphenylamino)benzaldehyde was obtained. The yield was 91.5 g (81.0%).
(Synthesis of 4-vinyltriphenylamine)

14.6 g of sodium hydride and 700 mL of 1,2-dimethoxyethane were placed in a three-neck flask, and while stirring at room temperature, 130.8 g of tetramethylphosphonium bromide was added. After adding one drop of anhydrous ethanol, the mixture was reacted for 4 hours at 70° C. Then 100 g of 4-(N, N-diphenylamino)benzaldehyde was added, the temperature was raised to 70° C., and the mixture was reacted for 5 hours. The solution was filtered, and an ether extract of the precipitate and the filtrate were washed in water. Next, the ether solution was dehydrated with calcium chloride, the ether was removed, and the crude product was obtained. Vinyltriphenylamine was obtained as lemon yellow needles upon recrystalization from ethanol. The yield was 83.4 g (84.0%).

Synthesis of 4-[2 (triethoxysilyl) ethyl]triphenylamine 40 mL of toluene, 9.9 g (60 mmol) of triethoxysilane, and 0.018 mmol of tris(tetramethyldivinyldisiloxane)platinum (0) complex in a toluene solution were placed in a three-neck flask; and while stirring at room temperature, 20 mL of a toluene solution of 8.2 g of 4-vinyltriphenylamine was dripped into the flask. After the addition, the mixture was stirred for 3 hours at 70° C. and the solvent was removed under reduced pressure. 4-[2-(triethoxysilyl)ethyl]triphenylamine, 12.1 g (91.7%), was obtained as lemon-yellow oil.

SYNTHESIS EXAMPLE 2

Synthesis of tri(4-formylphenyl)amine 50.7 g of triphenylamine and 53.3 mL of DMF were placed in a three-neck flask, and while stirring while cooling in ice water, 126.6 mL of phosphorus oxychloride was dripped into the flask. After the addition, the mixture was reacted for 5 hours at 95° C., then poured into 5 L of warm water, and stirred for 1 hour. The precipitate was collected by filtering and washed in a 1:1 ethanol/water. Tris(4-formylphenyl)amine was obtained in an amount of 65.3 g (95.9%).

Synthesis of tri(4-vinylphenyl) amine 14.6 g of sodium hydride and 700 mL of 1,2-dimethoxyethane were placed in a three-neck flask, and while stirring at room temperature, 130.8 g of tetramethylphosphonium bromide was added. One drop of anhydrous ethanol was added, a reaction was carried out for 4 hours at 70° C. The mixture was combined with 40.2 g of tri(4-formylphenyl)amine, and the reaction was continued for 5 hours at 70° C. The mixture was filtered. The filter cake was extracted with ethanol, and the ethanol combined with the filtrate and washed with water. After dehydrating the ether solution with calcium chloride, ether as removed, and a crude product was obtained. This product was twice recrystallized from ethanol yielding 38.4 g (97.3%) of tri(4-vinylphenyl)amine as lemon-yellow needles.

Synthesis of 4,4',4"-tris[2-(triethoxysilyl)ethyl] triphenylamine

40mL of toluene, 9.9 g (60 mmol) of triethoxysilane, and 0.018 mmol of tris(tetramethyl-divinyldisiloxane)platinum (0) complex in a toluene solution was placed in a three-neck flask, and while stirring at room temperature, 20 mL of a toluene solution of 3.3 g (13 mmol) of tri(4-vinylphneyl) amine was dripped into the flask. After the addition, the mixture was stirred for 3 hours at 70° C., then the solvent was removed under reduced pressure. 4,4',4"-[2-(triethoxysilyl)-ethyl]triphenylamine, 7.8 g (80.6%), was obtained as a yellow oil.

PRACTICAL EXAMPLE 1

7.9 g (18 mmol) of 4-[2-(triethoxysilyl)ethyl] triphenylamine from Synthesis Example 1 as well as 81 g of methyltrimethoxysilane, 20 g of phenyltrimethoxysilane, and 0.15 g of tetrabutyl-titanate were loaded into and stirred in a flask. A solution of 20 g of methanol and 10 g of water was added by dripping. After the addition, the components were mixed for 2 hours. The volatile solvent was removed under low pressure. A polysiloxane resin (S) represented by the formula below was obtained:

$$(QC_2H_4SiO_{3/2})_a (CH_3SiO_{3/2})_b (C_6H_5SiO_{3/2})_c (O_{1/2}R)_d$$

where Q is a triphenylamine unit, R is a methyl group or an ethyl group, and the a:b:c:d ratio is 0.2:1:1.9:2.

10 g of polysiloxane resin (S) were dissolved in 5 g of toluene and 5 g of tetrahydrofuran. The solution was applied by means of a bar coater onto a glass plate, and the coating was dried and cured for 15 hours at 140° C. Observations under a microscope showed that a uniform coating film was formed.

(1) The polysiloxane resin solution formed above was cast on clean 5 cm×5 cm aluminum plates. The solvent was removed, and the coating dried. The coating was heated for 15 hours at 140° C. to form a hard 12 μm thick film on the aluminum plate. A corona charge was formed by applying 1 kV to the surface of the film. A positive 1 kV charge was applied to one side of the aluminum plate from 1 DC power source (Mod. TR6120, the product of Advantest Co., Ltd.). Measurements of the potential on the surface of the film using a surface potential measurement instrument (TREK142000) showed that the change on the surface was neutralized and reduced to 600 V.

(2) By the same method as described in item (1) above, a film was formed on an ITO glass plate. Gold was applied onto the film by evaporation to form a counter-electrode. Mobility of electron holes was measured by the Time-of-Flight (TOF) method with 337 nm $N_2$ laser radiation on the metal electrode side. At room temperature, extrapolated mobility was equal to $7\times10^{-8}$ cm$^2$/Vs.

PRACTICAL EXAMPLE 2

40 g of toluene, 7.9 g (18 mmol) of 4-[2-(triethoxysilyl) ethyl]triphenylamine from Synthesis Example 1 as well as 60 g of methylsilsesquioxane (a product of partial hydrolysis of methyltrimethoxysilane with 33 wt. % methoxy groups remaining), 10 g of methanol, and 6 g of water were loaded into a flask and subjected to heating and refluxing for 2 hours with stirring. The volatile solvents were removed under low pressure. A polysiloxane resin (T) represented by the formula below was obtained:

$$(QC_2H_4SiO_{3/2})_x (CH_3SiO_{3/2})_y (O_{1/2}R)_z$$

where Q is a triphenylamine unit, R is a methyl group or an ethyl group, and the x:y:z ratio is 0.2:7:2. 10 g of polysiloxane resin (T) were dissolved in 10 g of toluene. The solution was applied using a bar coater to a glass plate, and the coating was dried for 15 hours at 140° C. Observations under a microscope showed that a uniform film was formed.

We claim:

1. A method of manufacturing a polysiloxane material having charge transporting properties, the method comprising cohydrolyzing and condensing in an organic solvent, a mixture comprising:

(I) an organosilicon compound or a partially hydrolyzed product of the organosilicon compound where the organosilicon compound is selected from a group consisting of $R_3SiZ$, $R_2SiZ_2$, $RSiZ_3$ and $SiZ_4$, wherein R is a monovalent hydrocarbon group and Z is a hydrolyzable group and (II) a charge transporting silicon compound represented by the formula:

$$A-(R^1SiR^2_{3-n}Q_n)_p$$

wherein A denotes an organic group derived from a charge transporting compound having the ionization potential of 4.5 to 6.2 eV, which is an aromatically substituted, tertiary amine having a plurality of aromatic groups, where at least one of the aromatic hydrocarbon groups is bonded to $R^1$ which is an alkylene group having 1 to 18 carbon atoms; $R^2$ is a monovalent hydrocarbon group having 1 to 15 carbon atoms; Q is a hydrolyzable group; n is an integer from 1 to 3; p is an integer from 1 to 3, thereby providing polysiloxane resin having a ratio of monovalent hydrocarbon groups to silicon atoms of 0.5 to 1.5.

2. The method of claim 1 wherein the hydrolyzable groups of the charge transporting component are alkoxy groups having 1 to 6 carbon atoms.

3. The method of claim 1 wherein the hydrolyzable groups of the organosilicon compound are alkoxy groups having 1 to 6 carbon atoms.

4. The method of claim 1 wherein the ratio of the charge transporting component to the organosilicon compound is within the range of 20 to 200 parts by weight of the charge transporting component per 100 parts by weight of the organosilicon compound.

5. The method of claim 2 wherein the ratio of the charge transporting component to the organosilicon compound is within the range of 20 to 200 parts by weight of the charge transporting component per 100 parts by weight of the organosilicon compound.

6. The method of claim 3 wherein the ratio of the charge transporting component to the organosilicon compound is within the range of 20 to 200 parts by weight of the charge transporting component per 100 parts by weight of the organosilicon compound.

7. The polysiloxane material having charge transporting property prepared by the method of claim 1.

8. The polysiloxane material having charge transporting property prepared by the method of claim 2.

9. The polysiloxane material having charge transporting property prepared by the method of claim 3.

10. The polysiloxane material having charge transporting property prepared by the method of claim 4.

11. The polysiloxane material having charge transporting property prepared by the method of claim 5.

12. The polysiloxane material having charge transporting property prepared by the method of claim 6.

* * * * *